Dec. 25, 1951      E. A. GRIMMER      2,580,170

THREAD CLEANER

Filed Aug. 4, 1949

INVENTOR,
ERNEST A. GRIMMER,
By Herbert A. Winturn,
ATTORNEY.

Patented Dec. 25, 1951

2,580,170

UNITED STATES PATENT OFFICE 2,580,170

THREAD CLEANER

Ernest A. Grimmer, Indianapolis, Ind.

Application August 4, 1949, Serial No. 108,581

2 Claims. (Cl. 74—424.8)

This invention relates to a construction designed to clean threads of a member entering an opening or hole which is screw-threaded to receive that member, all in the absence of having to apply separate parts, or employ any complicated construction.

The invention has a wide range of applications, one particular application being that to a stem of a valve such as may be used in a power plant, where the valve stem is exposed to fly ash, a greasy atmosphere, or the like, so that galling of the valve stem, or even sticking of the stem upon attempting to close the valve is avoided.

In many of the modern steam plants, extremely high pressures of steam have to be handled accompanied by the high temperatures thereof, and valves to control flow of such steam run into considerable money, some costing several thousands of dollars each. The valve itself is not operated at regular intervals, but often times there is a considerable lapse of time before the valve has to be closed, and by that time, the threaded stem which is exposed to the atmosphere refuses to feed down through the usual bushing which is carried by the valve as a means to advance the stem into the valve body. The only solution to that problem so far has been to employ two valves, hoping that one of the valves would be successful in its operation if the other valve sticks and can not be closed.

Figure 2:
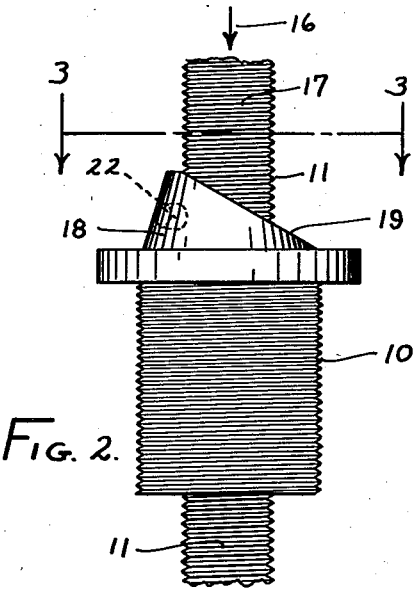
Figure 1:
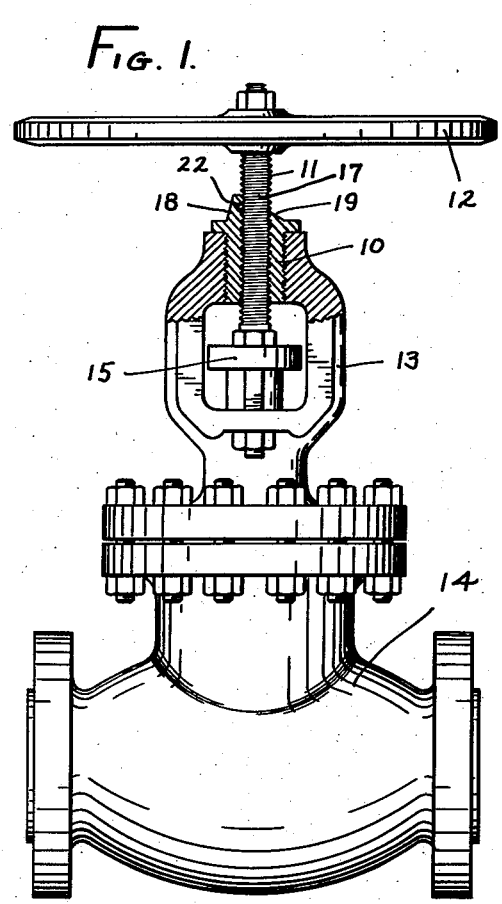
Figure 3:
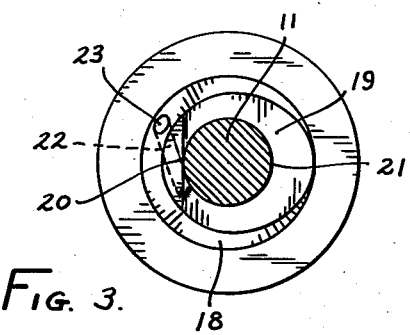
Figure 4:
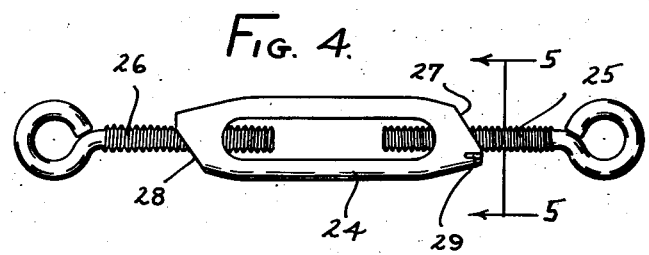
Figure 5:
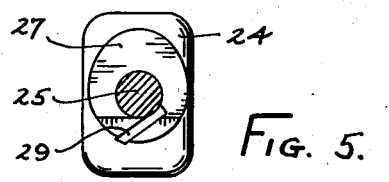

As above indicated, one of the great advantages of this invention is that it may be applied very readily to any combination of a screw-threaded member entering a screw-threaded hole. These and many other objects and advantages of the invention will become apparent to those skilled in the art, in the following description as illustrated by the accompanying drawing, in which Fig. 1 is a view in side elevation and partial section of a device to which the invention has been applied;

Fig. 2, a detail in vertical elevation of a screw-threaded member entered through a screw-threaded body;

Fig. 3, a transverse section on the line 3—3 in Fig. 2;

Fig. 4, a view in side elevation of a turn-buckle structure to which the invention is applied; and Fig. 5, a detail in transverse section on the line 5—5 in Fig. 4.

As illustrated in Figs. 1-3 inclusive, a valve bushing 10 is provided with an axial bore screw-threaded to receive therethrough the screw-threaded stem 11 which is operated in the usual manner by a hand wheel 12. The bushing 10 is carried, Fig. 1, by the bonnet yoke 13 mounted on top of the valve body 14. The lower end of the valve stem 11 is carried in the usual manner into the valve body 14 through the packing gland 15.

In the showing herein, the valve stem 11 is provided with a right-hand thread, so that the stem 11 will be carried downwardly in the direction of the arrow 16, Fig. 2, to move in the valve closing direction. Then the threads 17 on the stem 11, will, as viewed in Fig. 2, slope from an upper position on the right side to a lower position on the left side.

The top side of the bushing 10 is provided with an upwardly extending boss 18, generally shaped frusto-conically, but the boss is provided with a sloping face 19 sloping from an upper left-hand side thereof to a lower zone merging into the top of the bushing 10 to the right of the stem 11. In other words this face 19 is sloped in an opposite direction to that of the threads 17.

The angle of this face 19 to the horizontal, that is to a plane at right angles to the axis of the stem 11 is preferably made to be as great as may be feasible within this space permitted in order that the threads 17 upon entering the bushing through that face 19 will present an angle to that face sufficiently great to avoid wedging of dirt therebetween. A wiping action is set up for substantially one hundred eighty degrees travel of the stem 11, that is from the points 20 to 21, Fig. 3, as the threads progressively enter through that face 19 to be carried on downwardly through the bushing 10.

If this face 19 be sufficiently steep, and tilted to one side, then the dirt scraped from the threads 17 as the stem 11 may advance through that face may tend to slide away from the threads. However it has been discovered that the removal of the foreign matter from the threads is greatly facilitated after the greater amount has been scraped away on the surface of the face 19 by providing passageways through the body of the boss 18. In the form herein shown, a passageway 22 leads tangentially from the threaded interior of the bushing 10, that is also tangentially from the threads 17 of the stem 11 to open outwardly by the orifice 23, Fig. 3.

Another application now of the thread cleaning device is illustrated in Figs. 4 and 5, wherein it is applied to the ordinary turnbuckle receiving right-and-left-hand threaded bolts. In this form, the turnbuckle 24 receives the right-hand threaded bolt 25 in the one end, and the left-hand threaded bolt 26 in the other end. The ends of the turnbuckle 24 are cut away to have planar faces 27 and 28 respectively so that when the turnbuckle 24 is turned to retract those bolts 25 and 26 within the turnbuckle 24, that is pull the two bolts one toward the other, the threads will relatively be approaching the faces 27 and 28 in the same manner as above described in regard to the threads 17 of the stem 11 approaching the face 19. In this form of the invention, there is provided a dirt relief passageway 29 which may open out through the end of the turn buckle as indicated in Figs. 4 and 5.

It is to be understood that these openings 18 in the one form, and 29 in the other form, are provided to catch what little dirt may have been carried on into the body receiving the screw-threaded member before the major portion of the threads have been wiped upon entering the respective faces that are inclined in the opposite directions to the inclination of the approaching threads.

While I have herein shown and described my invention in its simplest form, it is obvious that it may be applied to both ends of a body receiving a screw-threaded bolt or the like, so that the threads may be cleaned in both directions of travel, that is into and out of the body. Also it is obvious that other structural changes may be made without departing from the spirit of the invention, and I therefore do not desire to be limited to that precise form shown, beyond the limitations which may be imposed by the following claims.

I claim:

1. For cleaning threads on a rod, a member having a bore therethrough internally threaded to receive said rod screw-threadedly therethrough; an exposed face on the member extending diagonally across the threaded bore of the member and inclined to the axis of said bore in a direction oppositely to the slope of the threads on the rod in relation to the advancing direction through the member, the toothed margin of said face about said bore presenting a major thread-scraping line across a plurality of rod threads; and said member having a minor thread scraping line within said bore removed from said face, and having a passageway within which said minor line appears, and from which said passageway leads to open externally of the member, said passageway being substantially tangential to said bore.

2. For cleaning threads on a rod, a member having a bore therethrough internally threaded to receive said rod screw-threadedly therethrough; an exposed face on the member extending diagonally across the threaded bore of the member and inclined to the axis of said bore in a direction oppositely to the slope of the threads on the rod in relation to the advancing direction through the member, the toothed margin of said face about said bore presenting a major thread-scraping line across a plurality of rod threads; and said member having a minor thread scraping line within said bore removed from said face, and having a passageway within which said minor line appears, and from which said passageway leads to open externally of the member, said passageway being substantially tangential to said bore; said passageway opening at a position around said member spaced from said face in a direction toward which a point on said rod threads is moving along said minor line when the rod is advancing through said member.

ERNEST A. GRIMMER.

REFERENCES CITED

The following references are of record in the file of this patent:

UNITED STATES PATENTS

| Number | Name | Date |
| --- | --- | --- |
| 79,397 | Rogers | June 30, 1868 |
| 750,412 | Stouffer | Jan. 26, 1904 |
| 1,132,521 | Jennings | Mar. 16, 1915 |
| 1,937,547 | Cartlidge | Dec. 5, 1933 |
| 1,946,931 | Chong | Feb. 13, 1934 |
| 2,091,374 | Pease | Aug. 31, 1937 |
| 2,445,125 | Reyburn et al. | July 13, 1948 |